United States Patent [19]

Wainwright

[11] Patent Number: 4,712,505
[45] Date of Patent: Dec. 15, 1987

[54] COMBINATION HAZARDOUS LIQUID AND WATER SENSOR

[75] Inventor: H. Kent Wainwright, Laramie, Wyo.

[73] Assignee: In-Situ, Inc., Laramie, Wyo.

[21] Appl. No.: 789,153

[22] Filed: Oct. 18, 1985

[51] Int. Cl.[4] ............................................. G01F 23/00
[52] U.S. Cl. ..................................... 116/227; 116/281
[58] Field of Search ............... 116/212, 217, 218, 227, 116/276, 281, 283; 73/40.5 R, 49.1, 49.2, 49.5, 290 R; 340/590, 591, 605; 74/501 F, 501 D; 403/2

[56] References Cited

U.S. PATENT DOCUMENTS

| | | | |
|---|---|---|---|
| 1,607,751 | 11/1926 | Rippingille | 74/501 D |
| 2,911,939 | 11/1959 | Marks | 116/227 |
| 3,564,526 | 2/1971 | Butts | 340/242 |
| 3,621,810 | 11/1971 | Zuck, Jr. | 116/283 |
| 3,720,797 | 3/1973 | Gunn et al. | 200/61.08 |
| 3,787,650 | 1/1974 | Lewis | 200/61.04 |
| 4,131,773 | 12/1978 | Maham et al. | 200/61.05 |
| 4,135,386 | 1/1979 | Peterson et al. | 73/40 |
| 4,305,068 | 12/1981 | Klein | 340/605 |
| 4,523,454 | 6/1985 | Sharp | 73/49.2 |
| 4,568,925 | 2/1986 | Butts | 73/49.2 |
| 4,682,156 | 7/1987 | Wainwright | 340/603 |

FOREIGN PATENT DOCUMENTS

| | | | |
|---|---|---|---|
| 53621 | 10/1931 | Fed. Rep. of Germany | 116/217 |
| 777530 | 11/1980 | U.S.S.R. | 73/40.5 R |

Primary Examiner—Charles Frankfort
Assistant Examiner—W. Morris Worth
Attorney, Agent, or Firm—Sheridan, Ross & McIntosh

[57] ABSTRACT

Apparatus and method are provided for sensing the presence of product and/or water in the annular space of a double wall storage tank. The apparatus includes both a product sensing element and a water sensing element that are operatively associated with each other to control the compression of a spring. The spring is operatively connected to a colored marker which is able to move from within an opaque tube to within a transparent tube using the force of the spring. When the product sensing element is contacted by product or the water sensing element is contacted by water so that the respective sensor weakens, the spring force is used to move the colored marker so that it is within the transparent tube. In such a position, the colored marker becomes visible, indicating that product and/or water are present in the annular space of the double wall storage tank.

3 Claims, 3 Drawing Figures

COMBINATION HAZARDOUS LIQUID AND WATER SENSOR

FIELD OF THE INVENTION

The present invention relates to a sensor for detecting one or more substances and, in particular, a sensor that is able to detect both the presence of hazardous liquid (or its vapor) and water.

BACKGROUND OF THE INVENTION

For many years, hazardous liquids have been used pervasively throughout industry - most notably in the areas of motor fuels, garment cleaning, aircraft manufacture and electronics manufacture. Environmental concerns have triggered a need for improved safeguards in the prevention of environmental release of hazardous liquids. City, county, and state governments have enacted legislation regulating the manner in which hazardous liquids are stored. Since it is common to locate storage tanks containing hazardous liquids below ground, and any storage tank has the potential to develop a breach wherein the product is able to escape the tank and be released into the environment, the product may reach and contaminate a water supply or cause many other hazardous situations. To minimize the release of hazardous liquids, certain government regulations require the use of a double wall storage tank.

The double wall tank has an inner wall and an outer wall. With a double wall tank, product is contained within the inner wall. Product that may pass through a breach in the inner wall would be held in the annular space between the inner and outer walls of the tank. Conversely, water from the neighboring soil that may pass through a breach in the outer wall would also enter the annular space. When either the outer wall or the inner wall is breached, the double wall storage tank must be replaced or repaired before product release into the environment occurs. In many areas, regulations require installation of a sensing device to indicate failure of either the outer wall or the inner wall.

SUMMARY OF THE INVENTION

A sensing device is provided that includes a sensor assembly which is located in an annular space defined between an outer wall and an inner wall of a double wall storage tank; this sensor assembly being used to detect the presence of at least one hazardous liquid, such as gasoline, when the product is found in the annular space. The sensor assembly is operatively connected to a tensioning assembly for use in releasing a colored marker in an indicator thus providing an indication that tank integrity is compromised.

More particularly, the sensor assembly of the present invention includes, in the preferred embodiment, a product sensing element and a water sensing element. Each of the product sensing element and water sensing element is connected to a sensing element holder. The sensing element holder has a generally cylindrical shape with a longitudinally extending slot formed at one end thereof. At the same end of the sensing element holder a pair of aligned holes are provided perpendicular to the slot. The sensor assembly also includes a tubular sensing element anchor that is positioned around the sensing element holder and includes a pair of aligned slits formed through the sensing element anchor at one end thereof. In one embodiment, the product sensing element is held by the holes formed in the sensing element holder while the water sensing element is held in the longitudinal slot of the sensing element holder and anchored in the two slits formed in the sensing element anchor.

The holes and slot at the end of the sensing element holder are configured so that the slot is cut partially into one end of the sensing element holder along an axial plane, making one end of the slot open while the other end is blind, and the holes pass through the sensing element holder near the open end of, and perpendicular to, the slot. The water sensing element is constructed as a rectangular block which is positioned in the slot and has a lateral dimension in excess of the diameter of the sensing element holder. The product sensing element is constructed as a small cylindrical rod which has a length equal to the diameter of the sensing element holder and is inserted in the perpendicular holes.

The assembled relationship of the sensing elements, the sensing element holder and the sensing element anchor is such that the product sensing element blocks the open end of the slot, thus locking the water sensing element against axial motion along the sensing element holder, and the lateral protrusions of the water sensing element extend into the slits in the sensing element anchor. This arrangement provides rigid connection by the sensing elements between the sensing element holder and the sensing element anchor.

The indicator unit includes a housing having an opaque tube, a transparent tube, a movable, colored marker and a compressing spring. The tensioning assembly includes a control cable connected from the sensing element holder, through the axis of the spring to the colored marker of the indicator unit.

Under normal conditions the rigid interconnection of the sensing element holder and the sensing element anchor by the sensing elements secures one end of the cable, thus maintaining the spring under compression against the colored marker connected to the opposite end of the cable.

In installation, the sensor assembly is passed into the inlet end of a riser tube that extends vertically from an opening in the outer wall of the tank. The sensor assembly is maneuvered (together with the attached tensioning assembly) until it is positioned in the lower portion of the annular space. In one embodiment, the indicator unit is connected to the inlet end of the riser tube so that it can be seen.

In a case in which product is in the annular space, the product sensing element responds to its presence by weakening; whereby the sensing element holder is freed from the water sensing element thus releasing the colored marker which is, in turn, driven by the spring, from concealment within the opaque tube to visibility within the transparent tube. Similarly, in a case in which water reaches the annular space and contacts the water sensing element, the water sensing element weakens, freeing the sensing element holder from the sensing element anchor, and releasing the marker which, again, is driven to the visible position. In either case, visibility of the marker provides an indication of invasion of the annular space.

Based on the foregoing summary, a number of salient objectives of the present invention are readily seen. A sensing device is provided for detecting the presence of a predetermined substance that leaks into the annular space of a double wall storage tank. Consequently, the user or owner of the tank is alerted that the tank should be inspected in order to determine its integrity and safeguard the surrounding environment. In the preferred embodiment, the invention is uniquely characterized by the use of both a product sensing element and a water sensing element so that, if either product or water is present, each will be detected. The detecting device is relatively simple in construction and inexpensive to make, operate and replace. In addition, the indicator unit is designed to provide an immediate and effective visual indication of the presence of product and/or water.

Additional advantages of the present invention will become readily apparent from the following discussion when taken in conjunction with the accompanying drawings.

DETAILED DESCRIPTION OF THE PREFERRED EMBODIMENTS

Figure 1:
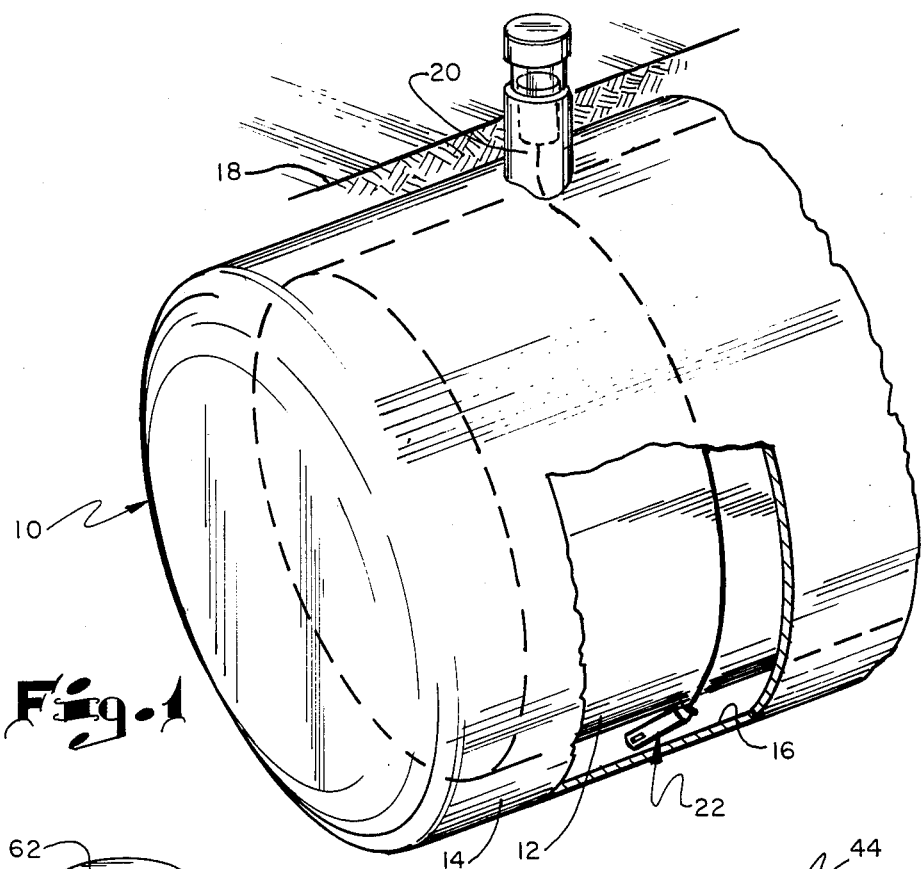
FIG. 1 is a perspective view showing the sensor assembly of the present invention being used in the annular space of a double wall storage tank for use in sensing product and/or water.

In accordance with the present invention, a sensing device is disclosed that is able to detect the presence of two substances. In the preferred embodiment, the substances that are detectable are a hazardous liquid (or its vapor) and water. With reference to FIG. 1, the sensing device is preferably used with a double wall storage tank 10. The tank 10 includes a generally cylindrical inner wall 12 and a generally cylindrical outer wall 14 that surrounds the inner wall 12. An annular space 16 is formed between the outer surface of the inner wall 12 and the inner surface of the outer wall 14.

The double wall storage tank 10 is typically located a desired distance below ground or the earth surface 18. The tank 10 is commonly used for hazardous liquid storage within the inner wall 12. A riser tube 20 extends an opening formed in the outer wall 14 of the tank 10. The riser tube 20 extends from the outer wall 14 to adjacent the ground 18. The riser tube 20 receives the sensing device of the present invention in order that the device be located properly for desired sensing.

Figure 2:
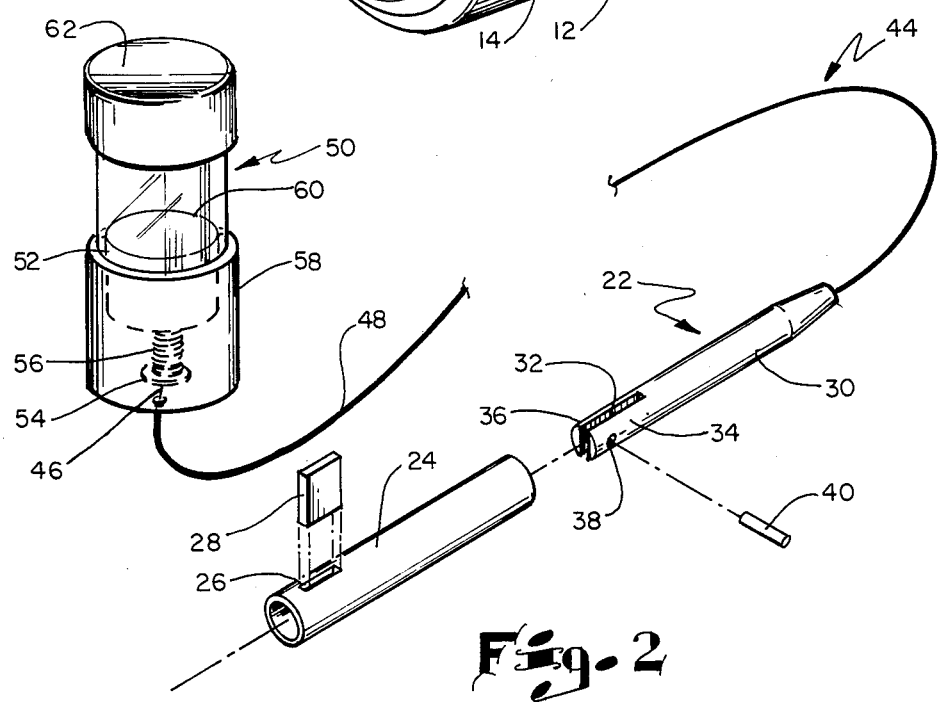
FIG. 2 is a partially exploded view showing the sensor assembly being connected to the indicator unit using the tensioning assembly.
Figure 3:
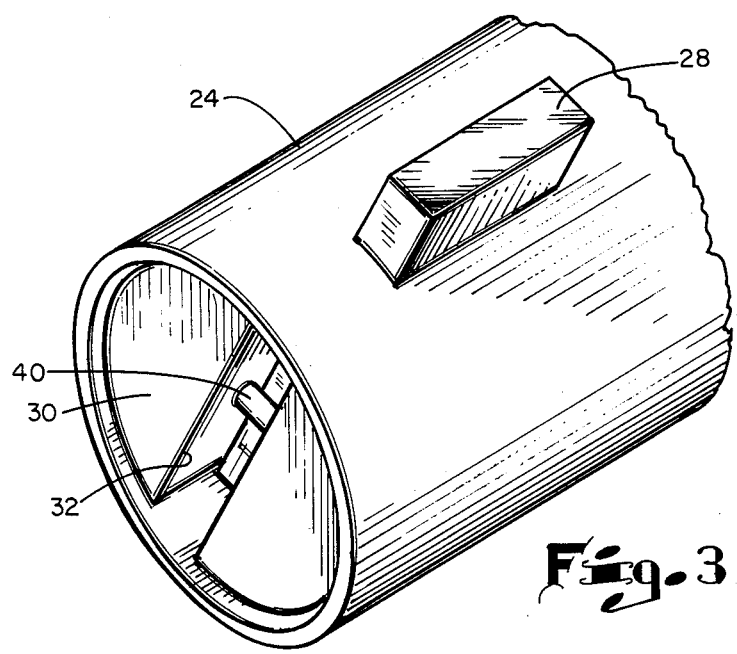
FIG. 3 is an enlarged, fragmentary, perspective view of the product sensing element, water sensing element and sensing element anchor in engagement in the absence of product or water.

With reference now to FIGS. 2 and 3, as well as FIG. 1, the sensing device includes a sensor assembly 22 connected to one end of the device. Specifically, in the embodiment in which the sensing device is used with the double wall storage tank 10, the sensor assembly 22 is positioned in, and at the bottom of, the annular space 16. The sensor assembly 22 includes a generally tubular sensing element anchor 24 having a pair of slits 26 formed through aligned, front end portions of the sensing element anchor 24. The slits 26 are able to receive a water sensing element 28, which is in the form of a rectangular block. The water sensing element 28 is of a size so that it can be received by the slits 26. In the preferred embodiment, the water sensing element 28 weakens severely in the presence of water. As can be seen in FIG. 3, a portion of the water sensing element 28 extends radially outwardly from the sensing element anchor 24. The sensor assembly 22 also includes a generally cylindrical sensing element holder 30. The holder 30 has a slot 32 formed through a longitudinally-extending portion of the holder 30. The slot 32 is formed at the front end of the sensing element holder 30 to form a pair of spaced fingers 34, 36. A hole 38 is formed in each of the fingers 34, 36. The holes 34, 36 are in axial alignment with each other and communicate with the slot 32. A second, product sensing element 40 is also provided, which has a cylindrical shape and is of a size for being inserted into the holes 34, 36 to be held therein. In the preferred embodiment, the product sensing element 40 weakens severely in the presence of a product, such as gasoline fuel.

The sensing element holder 30 has a diameter less than the inside diameter of the sensing element anchor 24 so that the sensing element holder 30, together with the product sensing element 40, can be readily inserted into the sensing element anchor 24. The sensing element holder 30 with the product sensing element 40 is positioned relative to the sensing element anchor 24 such that the two slits 26 communicate with a portion of the longitudinal slot 32. Once in this position, the sensing element anchor 28 is inserted into one of the slits 26 through the slot 32 and then into the other of the two slits 26 so that portions of the water sensing element 28 extend radially outwardly from each of the two slits 26. As also can be seen in FIG. 3, in such a position, the product sensing element 40 is located between the water sensing element 28 and the open end of the slot 32 wherein the product sensing element 40 engages or contacts a portion of the water sensing element 28, which is located in the slot 32. As will be discussed subsequently in greater detail, this arrangement of the first and second sensing elements 28, 40 is used in maintaining a marker in a first position.

The sensing device further includes a tensioning assembly 44 which includes a control cable 46 surrounded by an outer casing 48. The control cable 46 is conventionally connected to an end of the sensing element holder 30, which is opposite the end having the slot 32. The tensioning assembly 44 can be of any desired length. In the embodiment of FIG. 1, the tensioning assembly 44 should have a length that enables the sensor assembly 22 to be positioned adjacent the bottom of the annular space 16. The opposite end of the tensioning assembly 44 is connected to an indicator unit 50, which is used to indicate invasion of the annular space 16 by one or both substances. More particularly, the control cable 46 is connected to a movable colored marker 52. In order to move the colored marker 52, the tensioning assembly 44 also includes a support member 54 and a spring 56, which is positioned between the bottom end of the colored marker 52 and the top surface of the support member 54. In addition to the colored marker 52, the indicator unit 50 includes a transparent tube 60 extending coaxially from an opaque tube 58 and a cap 62 covering the open end of the transparent tube 60.

In the preferred embodiment, the colored marker 52 is in a first position within the opaque tube 58 holding the spring 56 compressed between the colored marker 52 and the support member 54. In this position, with neither of the sensing elements 28, 40 weakened, the two sensing elements 28, 40 cooperatively engage each other to maintain tension of the control cable 46 and thus also maintain compression of the spring 56 between the colored marker 52 and the support member 54.

In order to utilize the present invention, as previously pointed out, the sensing element anchor 24 and the sensing element holder 30 are concentrically positioned relative to each other to enable the sensing elements 28, 40 to engage each other so as to maintain the spring 56 in compression. Once so configured, the sensor assembly 22 can be positioned where desired, such as in the annular space 16 of the double wall storage tank 10. More specifically, the sensor assembly 22 is fed through the riser pipe 20 and maneuvered between the inner and outer walls 12, 14 until it is positioned adjacent to the bottom of the annular space 16. As can be appreciated, the tensioning assembly 44 is of a length to permit this maneuverability and positioning of the sensor assembly 22. The indicator unit 50 is connected to the riser pipe 20 such that at least the transparent tube 60 is readily visible for inspection. In the case in which a breach or crack should occur in the outer wall 14 of the tank 10 and water should seep into the annular space 16, the sensor assembly 22 will respond to this condition. The water sensing element 28 will weaken upon contact with the water that enters into, and accumulates at the bottom of, the annular space 16. Once the water sensing element 28 is sufficiently weakened, i.e. the water sensing element 40 no longer fixedly engages either the product sensing element 40 or the sensing element anchor 46, the sensing element holder 30 is free to be partially withdrawn from the sensing element anchor 24. Because the control cable 46 and the colored marker 52 are connected to the sensing element holder 30, the compression of the spring 56 is released whereby the spring 56 drives the colored marker 52 from within the opaque tube 58 to within the transparent tube 60. The position of the colored marker 52 within the transparent tube 60 indicates that one of the sensing elements 28, 40 was weakened and that water and/or product may be present in the annular space 16.

Similarly, in the case in which a breach is created in the inner wall 12 of the tank 10 such that product escapes past the inner wall 12 into the annular space 16, the product sensing element 40 is used to detect the presence of product. Specifically, product escapes through the breach in the inner tank 12 and accumulates at the bottom of the annular space 16. With sufficient product accumulation at the bottom of the annular space 16, product contacts and weakens the product sensing element 40. After the product sensing element 40 is sufficiently weakened, i.e. insufficient to maintain the product sensing element 40 in engagement with the water sensing element 28, the sensing element holder 30 is free to partially withdraw from the sensing element anchor 24. Like the movement that occurred when the water sensing element 28 weakened, the colored marker 52 is driven from within the opaque tube to within the transparent tube 60. Consequently, indication is provided that one of the two substances has been detected and that one of the two walls 12, 14 may have experienced a breach. With this information, the double wall storage tank 10 can be inspected to determine its condition.

It should be understood that, although the foregoing discussion is primarily directed at sensing water and unspecified product, the present invention could be used to detect a wide variety of liquids and/or vapors. It only being important that a sensing element be made of a material that is weakened by the substance to be detected. Further, even though the present invention has particular utility with a double wall storage tank, other applications for sensing substances are contemplated by the invention disclosed herein. The sensor assembly could also be used with other kinds of indicators and is not limited to the pop-up indicator shown in FIGS. 1 and 2. Relatedly, the indicator need not be positioned immediately adjacent to the riser pipe, but may be located, for example, inside a building in a position that is more readily observable. In addition, the sensing elements are not limited to a certain shape or size. That is, the sensing elements need not be cylindrical or block-shaped. It should also be appreciated that the present invention could be modified wherein only one substance is detectable such as product or water.

Based on the foregoing detailed discussion of the present invention, a number of important advantages of the invention are readily discerned. A sensing device is provided that indicates the presence of a substance, such as fuel and/or water, in the annular space of a double wall storage tank. In the preferred embodiment, two sensing elements are provided in which a first sensing element responds to the presence of water while a second sensing element responds to the presence of product so that a fault condition can be identified when either or both of two substances is detected. The invention is relatively simple to manufacture and easily adapted for use with the double wall storage tank. Relatedly, because of the relatively minimal expense in using the present invention, it is inexpensive to replace after one or both of the sensing elements is consumed while in use.

Although the present invention has been described with reference to certain embodiments, it should be understood that other variations and modifications can be effected within the spirit and scope of this invention.

What is claimed is:

1. An apparatus for use in sensing the presence of a first substance and for sensing the presence of a different second substance within an annular space defined by an inner wall and outer wall of a double wall storage tank, the apparatus comprising:

first sensing means for sensing the presence of said first substance, wherein said first sensing means weakens upon contact with said first substance;

second sensing means for sensing the presence of said second substance, wherein said second sensing means weakens upon contact with said second substance;

holder means for holding said first and second sensing means, wherein during use at least a portion of said holder means moves from a first position to another position when said first sensing means weakens upon contact with said first substance and/or when said second sensing means weakens upon contact with said second substance;

connecting means having first and second ends, said first end for connecting with said holder means, wherein said connecting means is elongated and flexible, and wherein said holder means and first and second sensing means are positioned during use in a bottom portion of said annular space free from restrictive engagement with said inner wall and outer wall of said double wall storage tank; and indicator means for indicating the presence of said first substance and/or said second substance, said indicator means being connected to said second end of said connecting means to be mechanically responsive during use to movement of said holder means away from said first position thereof.

2. An apparatus as recited in claim 1, wherein:
said holder means includes a lateral first slot portion which extends across said holding means for receiving said first sensing means; and
said holder means includes a longitudinal second slot portion which extends inward from one end of said holder means for receiving said second sensing means.

3. An apparatus as recited in claim 2, wherein: said first slot portion of said holder means communicating with at least a portion of said second slot portion of said holder means.

* * * * *